United States Patent [19]
Nurnberg et al.

[11] Patent Number: 5,224,580
[45] Date of Patent: Jul. 6, 1993

[54] POWER TRANSMISSION SYSTEM FOR A PASSENGER CONVEYOR

[75] Inventors: Thomas R. Nurnberg, Bettendorf, Iowa; Ernie Seggebruch, Geneseo, Ill.

[73] Assignee: Montgomery Elevator Company, Moline, Ill.

[21] Appl. No.: 899,875

[22] Filed: Jun. 15, 1992

[51] Int. Cl.⁵ .............................................. B66B 23/02
[52] U.S. Cl. .................................................... 198/330
[58] Field of Search ......................................... 198/330

[56] References Cited

U.S. PATENT DOCUMENTS

| | | | |
|---|---|---|---|
| 1,956,714 | 5/1934 | Graff-Baker | 198/330 |
| 3,696,909 | 10/1972 | Kojima et al. | 198/331 |
| 4,775,044 | 10/1988 | Hofling | 198/330 |
| 5,125,494 | 6/1992 | Nurnberg et al. | 198/330 X |

FOREIGN PATENT DOCUMENTS

| | | | |
|---|---|---|---|
| 585818 | 11/1934 | Fed. Rep. of Germany | 198/330 |
| 874206 | 4/1953 | Fed. Rep. of Germany | 198/330 |
| 951232 | 10/1956 | Fed. Rep. of Germany | 198/330 |
| 2095196 | 9/1982 | United Kingdom | 198/330 |

*Primary Examiner*—D. Glenn Dayoan
*Attorney, Agent, or Firm*—Wood, Phillips, VanSanten, Hoffman & Ertel

[57] ABSTRACT

A power transmission system is provided for use in a platform drive mechanism of a passenger conveyor which has a conveyor frame and a plurality of laterally extending passenger platforms which are movably supported for driven movement about an endless path on the frame and engaged with a pair of circuitous drive chains disposed on opposite sides of the conveyor frame. The transmission system has a multiple stage reduction gear drive positioned outboard of the passenger platforms and directly coupled between the drive chains and a motor for driving the passenger platforms in response to energization of the motor. A sprocket assembly has a drive shaft which extends laterally across the conveyor frame and mounts a pair of axially spaced sprockets. One of the sprockets is coupled between one axial end of the drive shaft and the gear drive output stage and engages one of the drive chains, and the other of the sprockets engages the second one of the drive chains and is coupled between a second axial end of the drive shaft and a support shaft journaled on the conveyor frame.

6 Claims, 7 Drawing Sheets

POWER TRANSMISSION SYSTEM FOR A PASSENGER CONVEYOR

FIELD OF THE INVENTION

The present invention relates generally to the art of passenger conveyors, and, more particularly, to a compact transmission system for efficiently transferring power to the platform drive mechanism of a passenger conveyor.

BACKGROUND OF THE INVENTION

A passenger conveyor typically includes a series of passenger platforms which are driven in an endless path between horizontally spaced landings. The most common types of passenger conveyors are escalators and horizontal walkways. In the case of escalators, the platforms are steps which are driven between an upper landing and a lower landing to facilitate the movement of individuals, cargo, and the like. Passenger conveyors also usually include hand rails which are movable along and supported by opposite sides of a main frame of the conveyor.

Individual passenger platforms normally are circuitously connected by a pair of drive chains which extend along opposite sides of the passenger conveyor and engage a powered sprocket assembly mounted at at least one end of the conveyor to effect continuous sequential movement of the platforms between the upper and lower landings. The platforms extend laterally across the conveyor between the opposite main frame sides to define a step band; that is, a spatial envelope between the upper and lower landings and between the opposite handrails through which the platforms travel The platforms, which move passengers toward an off-load landing, travel "above" the sprocket assembly and define an upper step band, while the inverted platforms which return to the on-load landing travel "below" the sprocket assembly and define a lower step band.

A prime mover, such as an electric motor, commonly is used to drive the platforms. In order to transfer power between the motor and the sprocket assembly, a transmission frequently is provided In a known passenger conveyor transmission construction, a conveyor is driven by a motor through a worm gear which engages a laterally extending output shaft. Worm drives are bulky and inefficient, and additionally require a chain connection between the last stage of the transmission and a sprocket assembly.

Other types of generally known transmissions directly engage a sprocket assembly and are mounted between the upper step band and the lower step band inboard the opposite sides of the conveyor frame Such a design requires that the upper step band and the lower step band be adequately spaced a vertical distance sufficient to accommodate the transmission therebetween. Modern building design considerations limit the overall packaging space allowed for a passenger conveyor and associated drive mechanism and thus limit the utility of existing direct drive transmissions.

The present invention is directed toward overcoming the problems set forth above by providing an efficient, compact power transmission for a passenger conveyor which does not adversely impact the overall packaging requirements of the conveyor.

SUMMARY OF THE INVENTION

An object of the present invention, therefore, is to provide a new and improved power transmission system for a passenger conveyor.

In the exemplary embodiment of the invention, a power transmission system is provided for use in a platform drive mechanism of a passenger conveyor which has a conveyor frame and a plurality of laterally extending passenger platforms. The platforms are movably supported for driven movement about an endless path on the frame and engage a pair of circuitous drive chains disposed on opposite sides of the frame. The transmission system generally includes gear means positioned outboard of the passenger platforms and directly coupled between the drive chains and a motor for driving the passenger platforms in response to energization of the motor.

More specifically, as disclosed herein, the gear means is a multiple stage reduction gear drive for transferring power between the motor and a sprocket assembly drivingly engaged with each of the drive chains. In the exemplary embodiment, the gear drive has an input stage coupled with the motor and an output stage coupled with the sprocket assembly The output stage preferably includes an output shaft which extends outboard of the gear drive and is journaled on the conveyor frame.

The sprocket assembly has a drive shaft which extends laterally across the conveyor frame and mounts a pair of axially spaced sprockets. One of the sprockets is positioned between one axial end of the drive shaft and the transmission output shaft and engages one of the drive chains, and the other of the sprockets engages the second one of the drive chains and is positioned between a second axial end of the drive shaft and a support shaft journaled on the conveyor frame. With this arrangement, power is applied directly to the sprocket assembly to energize each of the drive chains without requiring an excessive gap between the upper step band and the lower step band.

In an alternative embodiment of the invention, additional power is supplied to the conveyor by a second motor. A transmission having a multiple stage reduction gear drive is provided outboard each side of the step band and transmits power between an associated one of the motors and a common sprocket assembly.

More particularly, the sprocket assembly has a drive shaft which extends laterally between the transmissions and mounts a pair of axially spaced sprockets. One of the sprockets engages one of the drive chains and is interposed between one axial end of the drive shaft and an output shaft on the first transmission, and the other of the sprockets engages the second one of the drive chains and is interposed between a second axial end of the drive shaft and an output shaft on the second transmission Each of the transmission output shafts extends laterally outboard of the step band and are journaled on the conveyor frame.

In yet another embodiment of the present invention, additional power is supplied to the conveyor by third and fourth motors. Similar to the dual motor arrangement discussed above, a power transmission system is disposed on each side of the conveyor. Each transmission includes an elongated case for housing duplicate sprocket assemblies.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages, may be understood from the following description taken in conjunction with the accompanying drawings, in which like reference numerals identify like elements in the figures and in which:

DETAILED DESCRIPTION OF THE PREFERRED EMBODIMENTS

Figure 1:
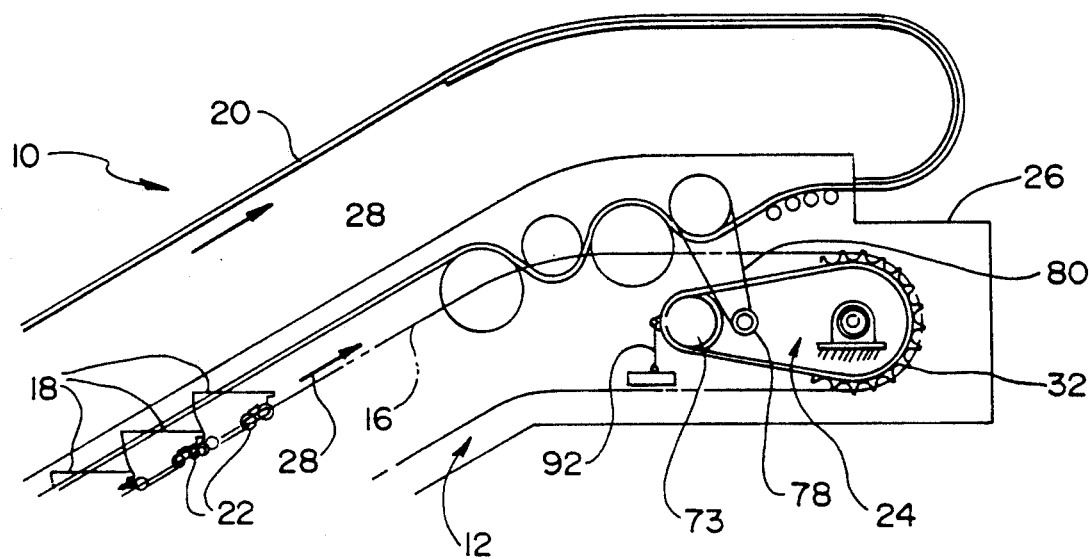
FIG. 1 is a somewhat schematic side elevational view of a portion of a typical escalator-type passenger conveyor incorporating the power transmission system of the present invention.

Referring to the drawings, FIG. 1 is a schematic illustration of a passenger conveyor in the form of an escalator, generally designated 10. As is generally known, such an escalator includes a stationary main frame, generally designated 12, which supports a conveyor assembly having a pair of horizontally spaced drive chains 16, a plurality of passenger platforms or steps 18 are drivingly engaged with the chains, and a pair of horizontally spaced circuitous handrails 20. As is known, each platform 18 is fixed to drive chains 16 and have rollers, as at 22, which run in a rail or track (not shown) mounted on main frame 12. Chains 16 and handrails 20 are driven in synchronism by a power transmission system, generally designated 24, to continuously move passenger platforms 18 in an endless path between a lower landing (not shown) and an upper landing 26. When handrails 20 and drive chains 16 are moved in the direction of arrows 28, a passenger at the lower landing steps onto a platform 18 and grasps one of the handrails 20 and the passenger is conveyed upwardly toward upper landing 26.

Figure 2:
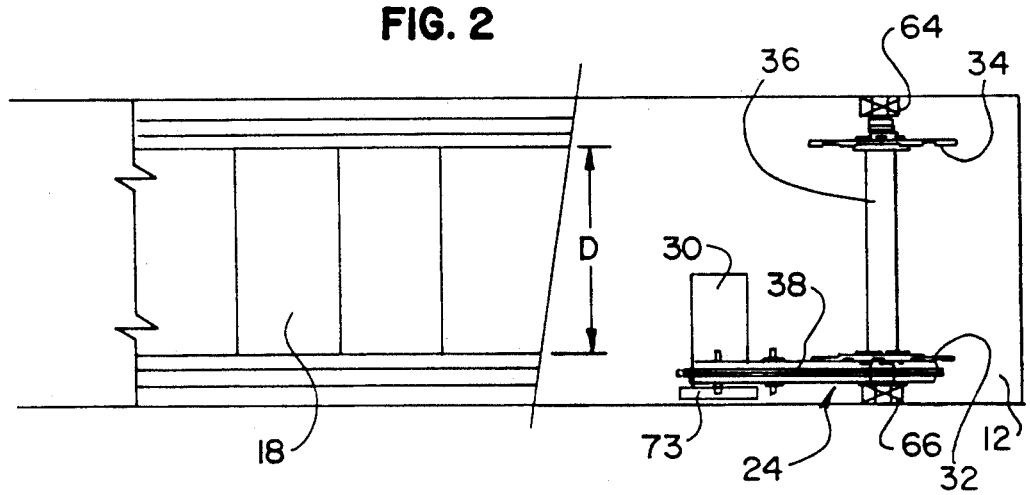
FIG. 2 is a partially cutaway plan view of the passenger conveyor illustrated in FIG. 1.

FIG. 2 shows an overhead depiction of power transmissions system 24 mounted to conveyor frame 12 adjacent upper landing 26. Passenger platforms 18 extend laterally across the conveyor frame and span a horizontal distance "D" to define a "step band"; that is, a spacial envelope through which the platforms pass as they are continuously driven between the lower landing and the upper landing.

Figure 3:
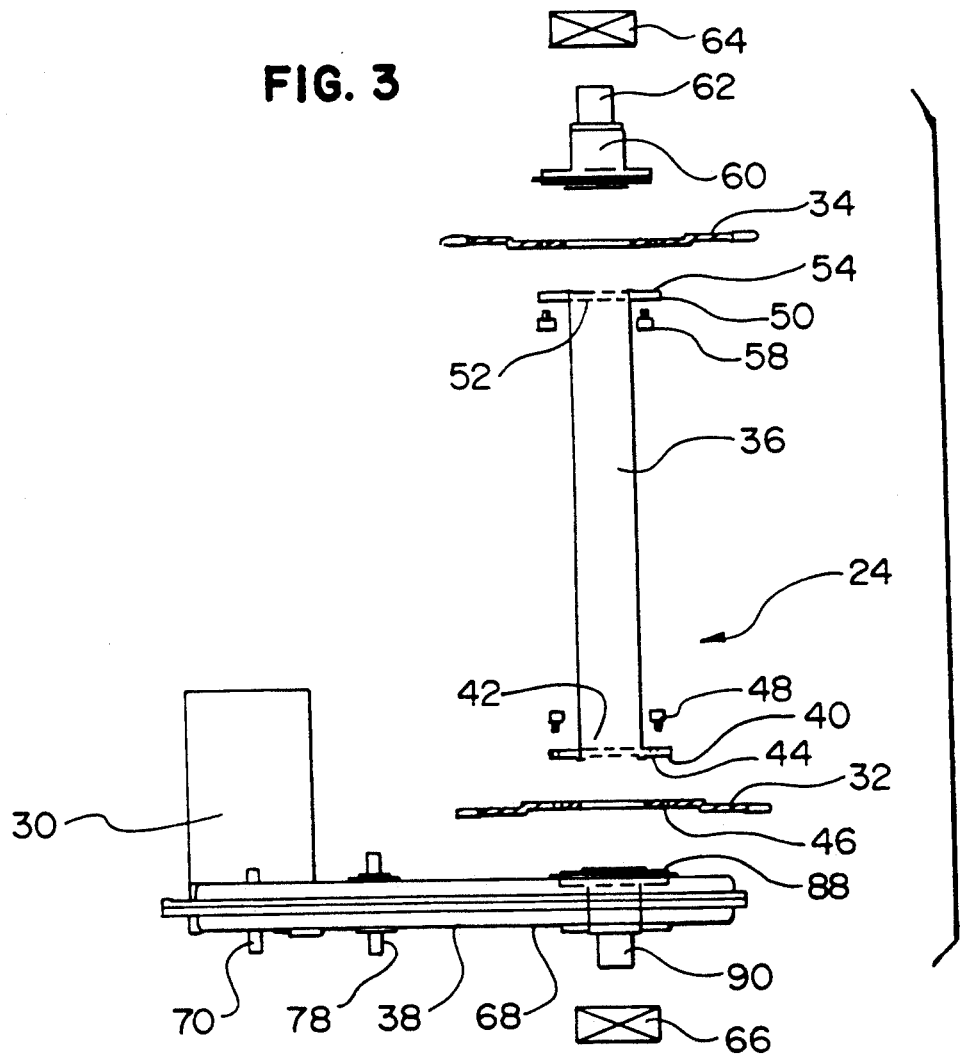
FIG. 3 is an exploded plan view, on an enlarged scale, of the power transmission system of the present invention, with the flywheel and brake removed.

Referring to FIG. 3 in conjunction with FIG. 2, power transmission system 24 includes an electric motor 30 coupled directly to a pair of sprockets 32 and 34 which, in turn, engage drive chains 16 for driving the passenger platforms in response to energization of the motor.

As best illustrated in FIG. 3, sprockets 32 and 34 are mounted on opposite axial ends of a hollow drive shaft 36 to define a sprocket assembly extending laterally across conveyor frame 12. A relatively narrow transmission 38, to be described further below, is drivingly engaged with electric motor 30 and extends longitudinally along conveyor frame 12 outboard of passenger platforms 18; that is, outboard the step band defined by platform width "D".

The drive shaft has an out turned radial flange 40 formed integrally at one axial end 42 of the drive shaft, with a plurality of circumferentially spaced axial apertures 44 extending through the flange. Corresponding apertures 46 are formed in sprocket 32, such that when drive shaft end 42 and sprocket 32 are properly aligned, fasteners 48 are inserted through the aligned apertures and engaged with transmission 38 to firmly secure the drive shaft and sprocket 32.

In a similar manner, drive shaft 36 has an out turned radial flange 50 formed at an opposite drive shaft end 52, and includes a number of circumferentially spaced axial apertures 54 which extend through flange 50. Corresponding axial apertures 56 are formed in sprocket 34, such that when sprocket 34 is properly aligned with drive shaft 36, such as during assembly of the power transmission system, fasteners 58 are inserted through apertures 54 in out turned flange 50 and apertures 56 in sprocket 34 to engage a support shaft 60. The support shaft has an axial hub 62 with a reduced diameter for engaging a bearing 64 mounted on conveyor frame 12. As will be described below in relation to transmission 38, a bearing 66 rotatably supports opposite drive shaft end 42 and, in cooperation with bearing 64, thereby journals drive shaft 36, along with directly coupled sprockets 32 and 34, on conveyor frame 12. With this arrangement, in addition to transmission 38, sprockets 32 and 34 are advantageously disposed outboard of the passenger conveyor step band and engage horizontally spaced drive chains 16 to effect continuous movement of passenger platforms 18.

Figure 4:
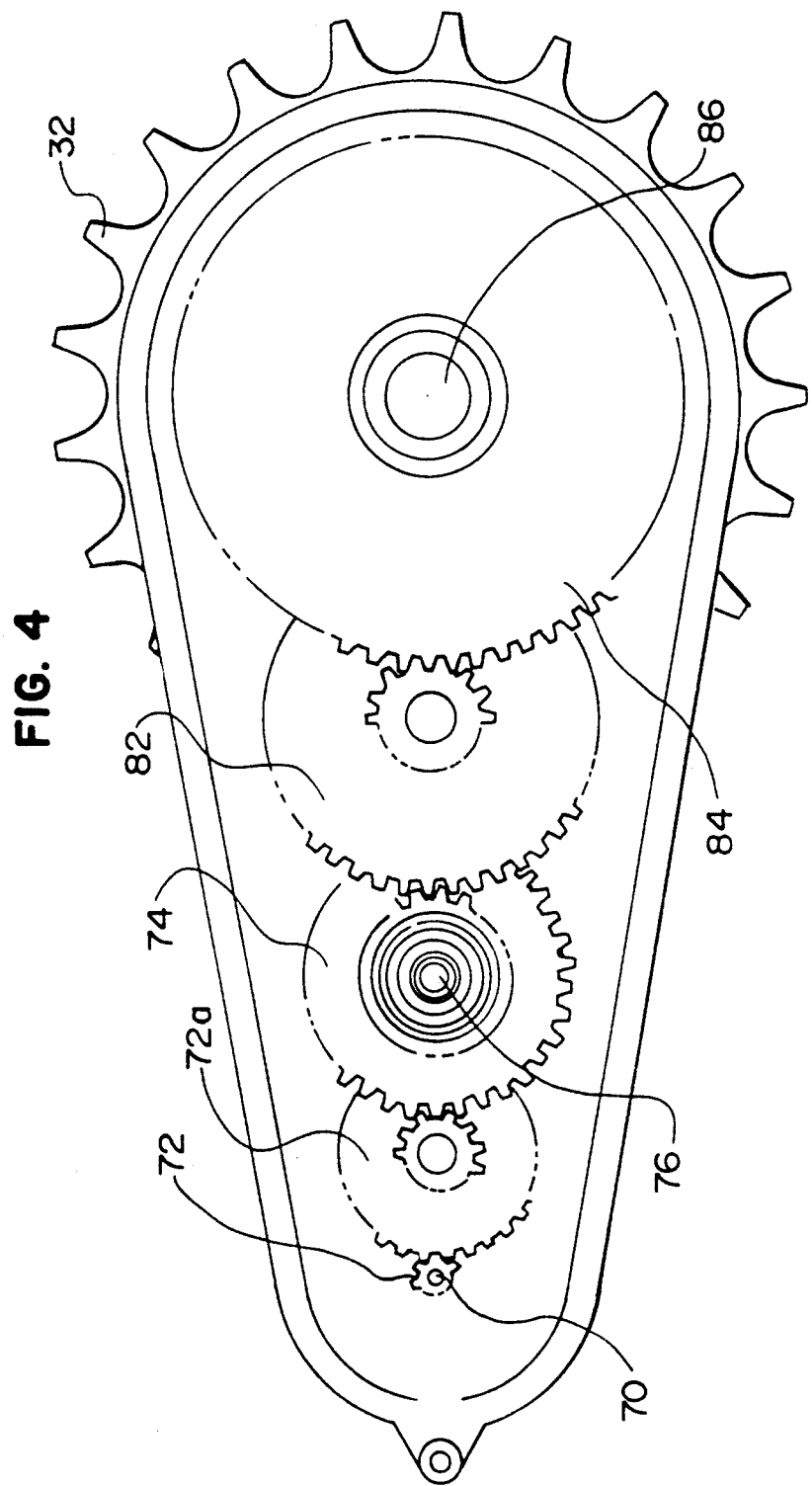
FIG. 4 is a side elevational view showing the arrangement of reduction gears in the present power transmission system.

Transmission 38 is shown in greater detail in FIG. 4 and includes a number of intermeshed gears rotatably supported within an enclosed transmission housing 68 and defining a multiple stage gear reduction drive. Although the gears illustrated in FIG. 4 are generally known helical gears, it should be understood that the present invention fully comprehends the alternative provision of any commonly known gear type, such as spur gears and the like, which is suited for directly connecting motor 30 with sprocket 32 in the manner herein provided.

As illustrated in FIG. 4, the gear drive includes four reduction stages. Electric motor 30 has an output shaft 70 which fixedly mounts an input stage gear 72 within seated transmission housing 68. The motor shaft extends through input stage gear 72 and outboard of the transmission housing to support a flywheel / brake 73 (not shown in FIG. 4). The flywheel /brake has inertial characteristics which are selected to provide preferred operating performance of the conveyor in response to energization and de-energization of motor 30, and is adapted to selectively provide desired deceleration of the motor shafts.

Input stage gear 72 is intermeshed with a first stage reduction gear 72a, and is thereby indirectly coupled with a second stage reduction gear 74. The second stage reduction gear is rotatably supported on an auxiliary power output shaft 76. The auxiliary power output shaft has a laterally extending hub 78 which projects outwardly of transmission housing 68 and engages a drive belt 80 (see FIG. 1) for supplying auxiliary power to drive handrails 20 in synchronism with passenger platforms 18.

A third stage reduction gear 82 is interposed between second stage reduction gear 74 and an output stage gear 84. The output stage gear is rotatably fixed to an output shaft 86 which extends laterally through the transmission housing and has a radial flange 88 (see FIG. 3) formed on the inboard side of transmission 38 and has a reduced diameter hub 90 on the outboard side.

The inboard radial flange 88 of output shaft 86 has a number of openings (not shown) for receiving fasteners 48 when sprocket 32 is positioned thereagainst by drive shaft 36. The output shaft hub engages bearing 66 on conveyor frame 12 to prevent vertical and longitudinal movement of power transmission system 24 relative to the conveyor frame.

Due to the large torques exerted by the sprocket assembly and which, therefore, are reacted by output stage gear 84, the transmission has a tendency to rotate about bearings 64 and 66. That is, although the transmission housing and enclosed gears are prevented from linear movement by the bearings, the entire transmission is free to rotate about an axis defined by drive shaft 36. Accordingly, a torque reaction arm 92 (FIG. 1) is rigidly connected between transmission housing 68 and conveyor frame 12 to oppose the rotational tendency of the transmission and minimize stresses which could otherwise arise in the power transmission system.

It is believed that the advantages of the construction of the power transmission system described in relation to FIGS. 1–4 can be clearly understood from the aforesaid description and is summarized as follows. Because the multiple stage gear reduction drive 38 is designed to fit within a narrow transmission housing outboard the passenger platform step band, the vertical distance between the "upper" platform path and the "lower" platform path is reduced, greatly enhancing the utility of the passenger conveyor in environments which would otherwise preclude the use of a more space-intensive mechanism. Moreover, the direct drive connection between electric motor 30 and drive chains 16 provides simple, efficient and reliable operation of the conveyor. The above-discussed approach, by which relatively deep gear reduction is achieved completely within a single enclosed module, permits the power transmission system to be easily adapted to conveyor applications requiring additional power.

More specifically, it has been determined that in applications wherein a passenger conveyor extends through a vertical rise greater than approximately 25 feet, the above described single motor arrangement is incapable of providing sufficient power to drive the passenger platforms between the lower landing and the upper landing. Accordingly, an alternative embodiment of the present invention is envisioned and illustrated in FIG. 5.

Figure 5:
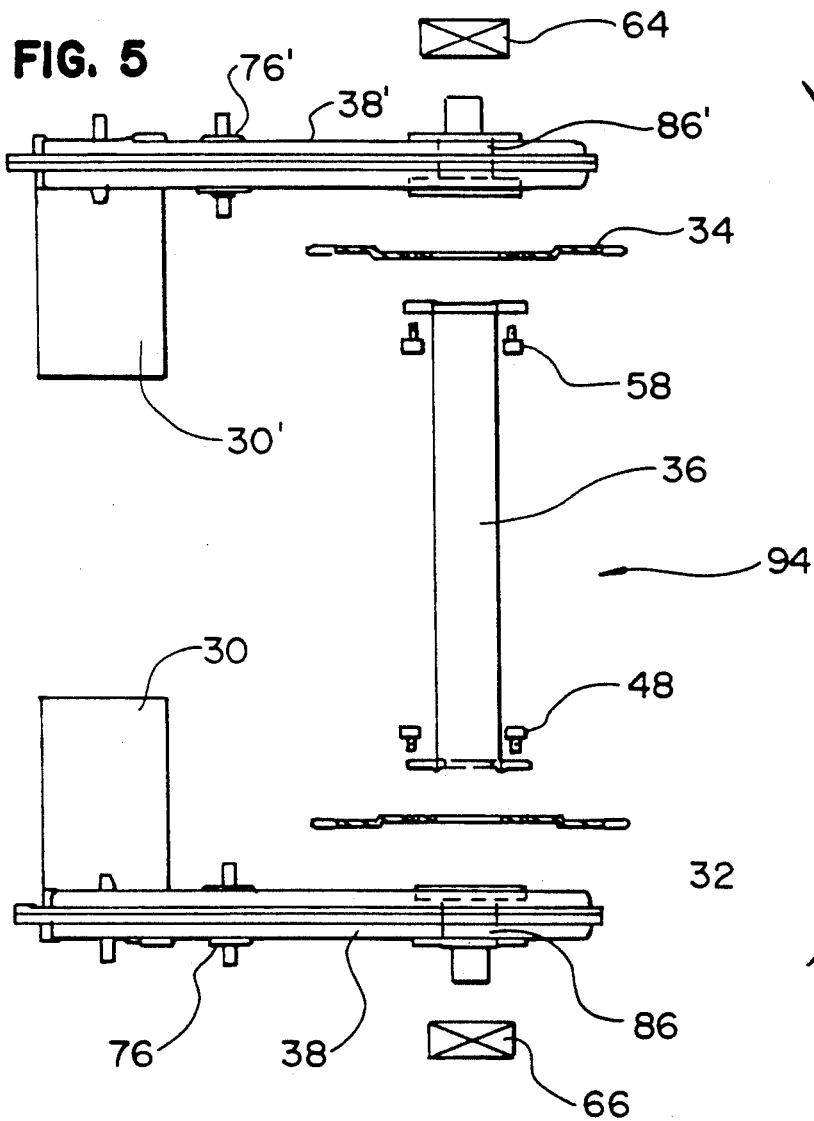
FIG. 5 is an exploded plan view, on an enlarged scale, of an alternative embodiment of a power transmission system having two motors and two gear drives.

FIG. 5 shows a generally symmetric construction of a dual motor power transmission system, generally designated 94 in which a pair of transmissions 38 and 38' are disposed on opposite outboard sides of the passenger conveyor step band and are directly coupled between electric motors 30 and 30', respectively, and a common drive shaft 36. Each of the transmissions are generally identical mechanisms and include four stage reduction gear drives (as described above in relation to FIG. 4) in which a respective motor output shaft mounts an input stage gear within an enclosed transmission housing. Each input stage gear meshes with a corresponding first intermediate stage gear having an auxiliary power output shaft 76 and 76', respectively, for driving handrails 20 in synchronism with passenger platforms 18.

One end of common drive shaft 36 clamps sprocket 34 to an output shaft 86' which is drivingly engaged with the reduction gear drive associated with transmission 38', and is journaled on conveyor frame 12 by bearing 64. An opposite end of the common drive shaft clamps sprocket 32 to an output shaft 86 which is drivingly engaged with the reduction gear drive associated with transmission 38, and is journaled on conveyor frame 12 by bearing 66.

As noted above, because each of transmissions 38 and 38' are mounted outboard of the passenger conveyor step band, the packaging requirements of the conveyor drive mechanism and, thus, the passenger conveyor itself, are reduced. The compact, modular approach embodied in the power transmission system of the present invention permits the straight forward adaptation of a single motor arrangement to a more powerful multiple motor arrangement.

Figure 6:
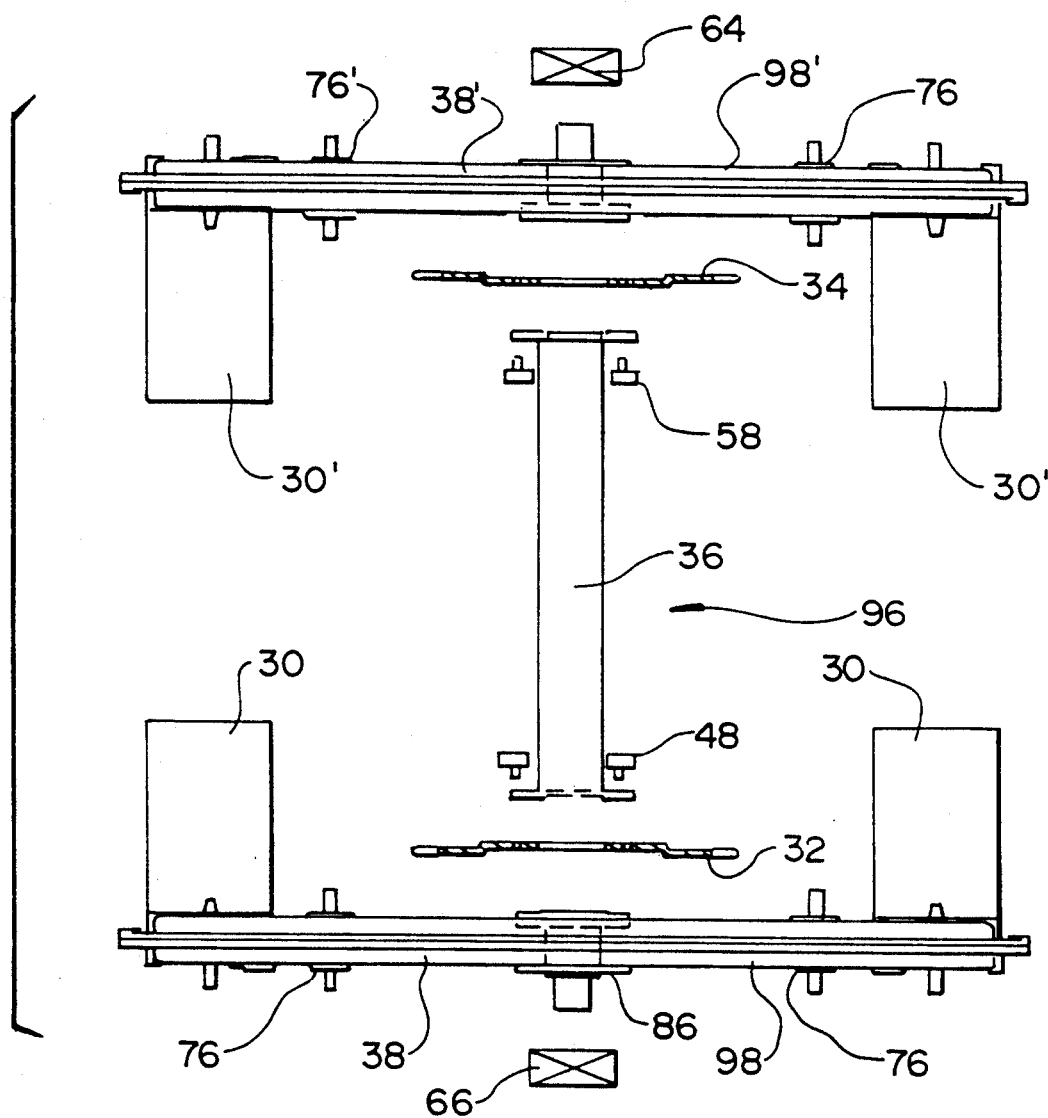
FIG. 6 is an exploded plan view, on an enlarged scale, of an alternative embodiment of a power transmission system having four motors and two gear drives.
Figure 7:
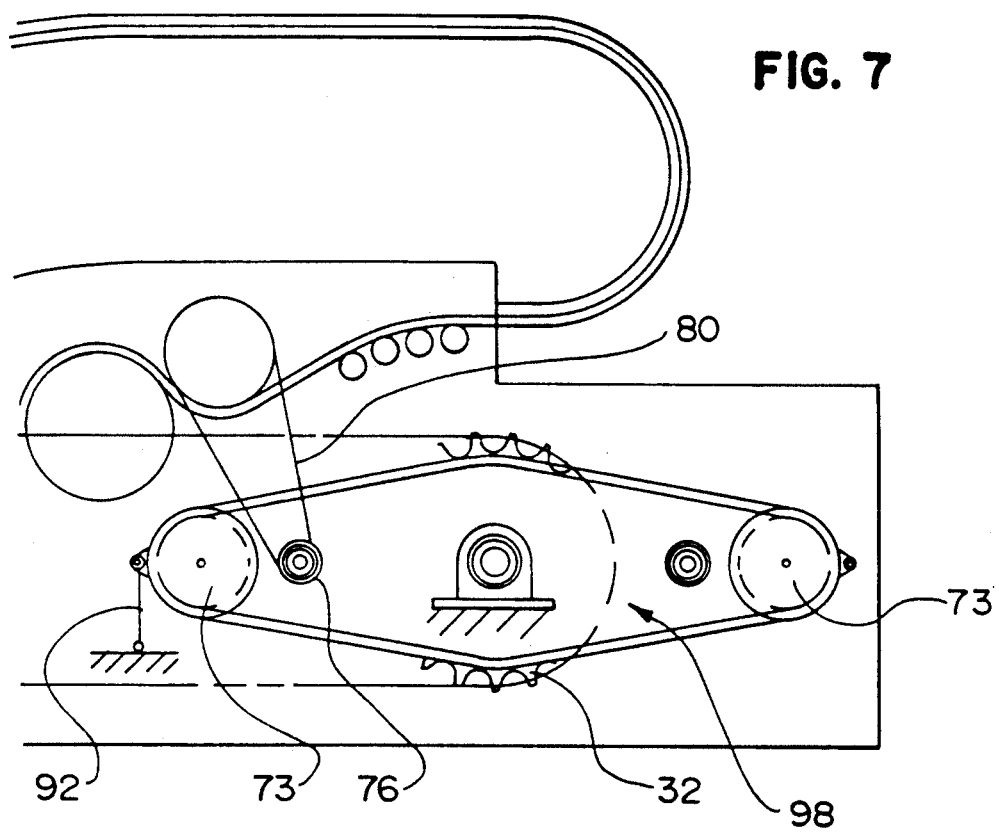
FIG. 7 is a somewhat schematic side elevational view of a portion of a passenger conveyor incorporating the power transmission system illustrated in FIG. 6.
Figure 8:
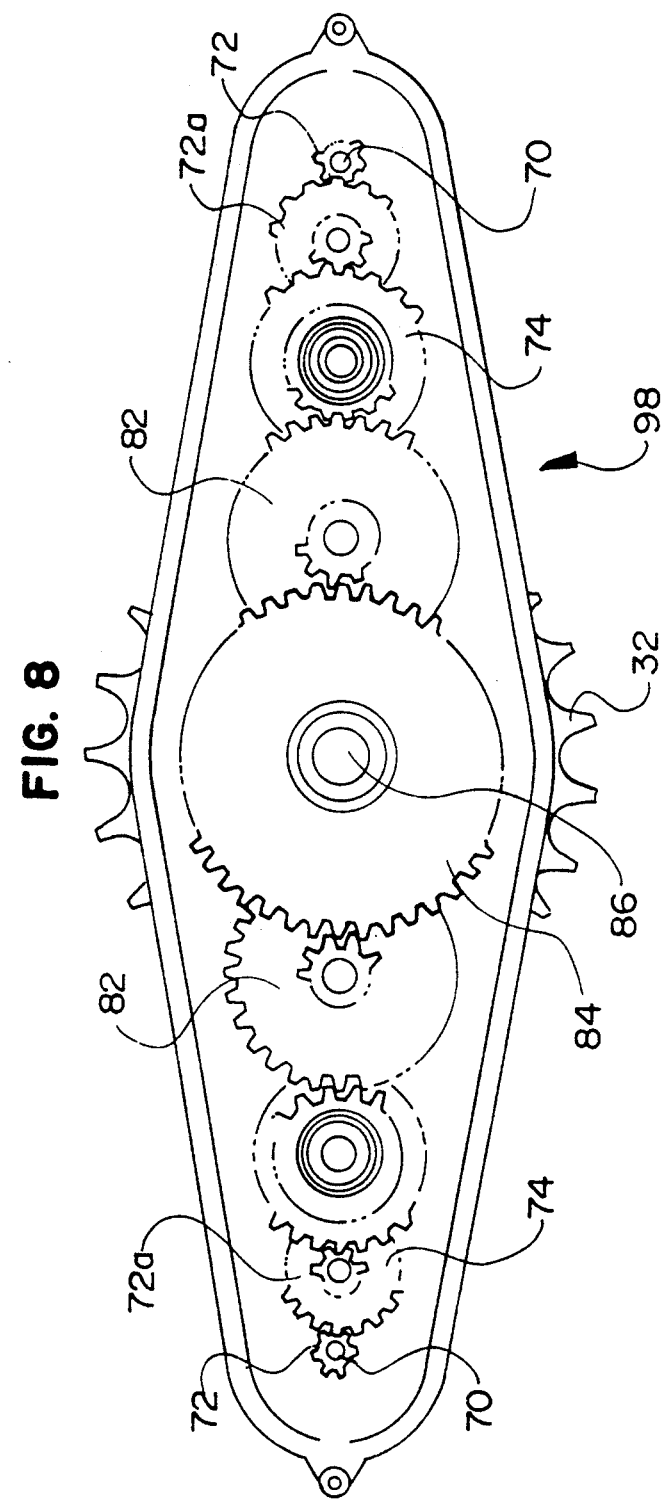
FIG. 8 is a side elevational view showing the arrangement of reduction gears in the power transmission system illustrated in FIG. 6.

More specifically, FIGS. 6–8 show a generally symmetric construction of a four motor power transmission system, generally designated 96 in which a pair of transmissions 98 and 98' are disposed on opposite outboard sides of the passenger conveyor step band and are directly coupled between a pair of electric motors 30 and a pair of electric motors 30', respectively, and a common drive shaft 36. Each of the transmissions are generally identical mechanisms and include four stage reduction gear drives (as described above in relation to FIG. 4) in which a respective pair of motor output shafts mount an input stage gear within an elongated transmission housing (see FIG. 8) for driving a common output shaft. Flywheel / brakes 73 and 73' are sized in relation to the amount of motor input to provide the necessary inertial and braking capacity.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a platform drive mechanism for a passenger conveyor which includes a conveyor frame and a plurality of laterally extending passenger platforms movably supported for driven movement about an endless path on the frame and engaged with circuitous drive chains on opposite sides of the conveyor frame, a power transmission system comprising:
   motor means mounted on the conveyor frame for driving the passenger platforms;
   a sprocket assembly operatively associated with the drive chains and including a laterally extending drive shaft, the drive shaft mounting a pair of axially spaced sprockets which are engaged respectively with the drive chains; and transmission means drivingly connecting the motor means and the sprocket assembly and disposed outboard of the passenger platforms, the transmission means including a plurality of intermeshed gears, one of the gears defining an input stage coupled with the motor means and another of the gears defining an output stage coupled with the drive shaft, said motor means comprising first and second motors for driving the sprocket assembly.

2. The power transmission system of claim 1 including one said transmission means disposed outboard each opposite side of the passenger platforms and drivingly interposed between a respective one of the first and second motors and the sprocket assembly.

3. The power transmission system of claim 2 wherein one of the transmission means comprises a first gear drive having an associated transmission output shaft extending laterally outboard one side of the passenger platforms and journaled on the conveyor frame, and the other transmission means a second gear drive having an associated transmission output shaft extending laterally outboard a second side of the passenger platforms and journaled on the conveyor frame.

4. The power transmission of claim 3 wherein the drive shaft is connected at one axial end thereof to the output shaft associated with the first gear drive, and the drive shaft is connected at a second axial end thereof to the output shaft associated with the second gear drive.

5. A power transmission system in a platform drive mechanism of a passenger conveyor which includes a conveyor frame and a plurality of laterally extending passenger platforms movably supported for driven movement about an endless path on the frame and engaged with circuitous drive chains on opposite sides of the conveyor frame, the power transmission system comprising:

a pair of motors mounted at opposite sides of the conveyor frame;

a sprocket assembly operatively associated with the drive chains and including a laterally extending drive shaft, the drive shaft mounting a pair of axially spaced sprockets which are engaged one with each of the drive chains;

a first transmission disposed outboard one side of the passenger platforms and having an output shaft engaged with the drive shaft and journaled on the conveyor frame, the first transmission including a gear reduction drive coupled directly between one of the pair of motors and the output shaft; and a second transmission disposed outboard another side of the passenger platforms and having an output shaft engaged with the drive shaft and journaled on the conveyor frame, the second transmission including a gear reduction drive coupled directly between the other of the pair of motors and the output shaft.

6. In a platform drive mechanism for a passenger conveyor which includes a conveyor frame and a plurality of laterally extending passenger platforms movably supported for driven movement about an endless path on the frame and engaged with circuitous drive chains on opposite sides of the conveyor frame, a power transmission system comprising:

motor means mounted on the conveyor frame for driving the passenger platforms;

a sprocket assembly operatively associated with the drive chains and including a laterally extending drive shaft, the drive shaft mounting a pair of axially spaced sprockets which are engaged respectively with the drive chains;

transmission means drivingly connecting the motor means and the sprocket assembly and disposed outboard of the passenger platforms, the transmission means including a plurality of intermeshed gears, one of the gears defining an input stage coupled with the motor means and another of the gears defining an output stage coupled with the drive shaft; and a torque reaction arm interconnected between the transmission means and the conveyor frame for opposing a rotational tendency of the transmission when power is transferred to the sprocket assembly.

* * * * *